United States Patent
De Palo et al.

(10) Patent No.: US 8,017,206 B2
(45) Date of Patent: Sep. 13, 2011

(54) PIPE SYSTEMS MADE FROM RANDOM COPOLYMERS OF PROPYLENE AND α-OLEFINS

(75) Inventors: Roberto De Palo, Ferrara (IT); Enrico Beccarini, Ferrara (IT); Roberta Marzolla, Rovigo (IT)

(73) Assignee: Basell Poliolefine Italia s.r.l., Milan (IT)

( * ) Notice: Subject to any disclaimer, the term of this patent is extended or adjusted under 35 U.S.C. 154(b) by 413 days.

(21) Appl. No.: 11/629,764

(22) PCT Filed: Jun. 16, 2005

(86) PCT No.: PCT/EP2005/006519
§ 371 (c)(1),
(2), (4) Date: Dec. 14, 2006

(87) PCT Pub. No.: WO2006/002778
PCT Pub. Date: Jan. 12, 2006

(65) Prior Publication Data
US 2007/0196608 A1    Aug. 23, 2007

Related U.S. Application Data

(60) Provisional application No. 60/591,573, filed on Jul. 27, 2004.

(30) Foreign Application Priority Data

Jun. 25, 2004 (EP) .................................... 04015039

(51) Int. Cl.
*B29D 22/00* (2006.01)
*C08F 8/00* (2006.01)
*C08L 23/00* (2006.01)
(52) U.S. Cl. ...................... 428/36.92; 525/191; 525/240
(58) Field of Classification Search ............... 428/36.91, 428/36.9, 36.92; 525/191, 240; 264/464, 264/478
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 5,145,819 A | 9/1992 | Winter et al. | |
| 5,324,800 A | 6/1994 | Welborn, Jr. et al. | |
| 6,084,047 A | 7/2000 | Holliday et al. | |
| 6,300,420 B1 | 10/2001 | Jääskeläinen et al. | |
| 6,330,420 B1 | 12/2001 | Honda | |
| 2007/0265398 A1 | 11/2007 | de Palo et al. | |

FOREIGN PATENT DOCUMENTS

| | | |
|---|---|---|
| EP | 045977 | 2/1982 |
| EP | 129368 | 12/1984 |
| EP | 361493 | 4/1990 |
| EP | 395083 | 10/1990 |
| EP | 416815 | 3/1991 |
| EP | 420436 | 4/1991 |
| EP | 444446 | 9/1991 |
| EP | 485823 | 5/1992 |
| EP | 573862 | 12/1993 |
| EP | 643066 | 3/1995 |
| EP | 671404 | 9/1995 |
| EP | 674991 | 10/1995 |
| EP | 728769 | 8/1996 |
| EP | 782587 | 7/1997 |
| EP | 1260546 | 11/2002 |
| JP | 60 235812 | 11/1985 |
| WO | 91/04257 | 4/1991 |
| WO | 96/11216 | 4/1996 |
| WO | 97/33117 | 9/1997 |
| WO | 03/037981 | 5/2003 |

*Primary Examiner* — Rena L Dye
*Assistant Examiner* — James Yager
(74) *Attorney, Agent, or Firm* — Dilworth IP, LLC

(57) ABSTRACT

Pipe systems having at least one layer comprising a semi-crystalline random polymer of propylene and 0.2 to 5 wt % 1-hexen and optionally a recurring unit selected from ethylene and a $C_4$-$C_{10}$ α-olefin in an amount from more than 0 to 9% by moles. The polymer exhibits broad molecular weight distribution, in terms of the ratio of weight average molecular weight to numeric average molecular weight formula (I), ranging from 5 to 11, molecular weight distribution of monomodal type and hexen-1 content in the fraction with an intrinsic viscosity of equal to or higher than 3.3 dl/g lower than the hexen-1 content in the fraction with an intrinsic viscosity of less than 3.3 dl/g.

$$(\overline{M}w/\overline{M}n) \qquad (I)$$

10 Claims, No Drawings

PIPE SYSTEMS MADE FROM RANDOM COPOLYMERS OF PROPYLENE AND α-OLEFINS

The present invention relates to pipe systems made from semi-crystalline random polymers of propylene and an α-olefin.

Pipes, tubing and fittings are intended within the term of pipe systems.

By the term polymer it is intended every polymer with one or more comonomers, such as copolymers and terpolymers.

Pipe systems according to the present invention are particularly suitable to transport fluids under high pressure and for outdoor sewerage and pressure pipe installation.

In pressure pipe applications polypropylene is appreciated in hot water distribution systems inside buildings and/or when high chemical resistance is required.

Pipes wherein the polypropylene plastic material is used in the place of the currently used plastic materials are not usually used till now, in particular due to lower creep resistance or insufficient impact strength of the propylene material.

For outdoor installation, the resistance to rock impingement and to slow crack growth are very important parameters for the pipes durability. The higher the stress crack resistance, the better this performance is.

In conventional pipe installation, a sand bed is employed on which the plastic pipe sits. This sand bed protects the surface of the polyethylene pipe from the destructive mechanical forces accidentally applied to it by, for example, sharp rocks and stones in the surrounding earth. The use of tailored sand requires an extra installation step and, when transportation and purchase costs for the sand are considered, the total cost of using sand increases the total installation cost. Therefore, a further advantage of the present polypropylene pipes is that they can afford a significant reduction in pipe installation costs, whilst still providing superior mechanical properties.

U.S. Pat. No. 6,330,420 discloses a copolymer composition prepared from copolymers of propylene and a $C_2$-$C_{12}$ α-olefin having high molecular weight and a molecular weight distribution from 6 to 15. The composition is a blend of a first copolymer having a high molecular weight and a comonomer content from 3 to 10 wt % and a second copolymer having a lower molecular weight than the first copolymer and a comonomer content from 2 to 6 wt %. Said copolymer composition is suitable for pipe and fitting applications. Pipes thus produced are stiff and have slow crack properties. The working examples only disclose broad propylene-ethylene random copolymers. The pipes produced from the said copolymer composition show a highest time to failure over 10000 hours measured according to ISO 1167 carried out at 95° C. applying a hoop stress level of 4.5 MPa.

International patent application WO 03/37 981 discloses pipes solely or mainly made from a crystalline random copolymer of propylene with a superior α-olefin and, optionally, ethylene; as superior α-olefin butene-1 only is cited in the disclosure and used in the working examples. The pipes exhibit good burst stress performances. However, they are subjected to failure at a temperature of 95° C. after a relatively short time in comparison with the pipes according to the present invention. For example, when applying a hoop stress of 4.2 MPa at 95° C., pipes according to the said patent application are subjected to failure about after 1000 hours.

Now it has surprisingly been found that pipes wherein at least one layer is comprising semi-crystalline random propylene polymers containing recurring units derived from 1-hexene (hereinafter referred to as propylene-hexene-1 polymer) exhibit good mechanical properties, in particular superior burst pressure resistance (creep resistance) and rigidity.

The pipe systems according to the present invention also exhibit high stress-crack resistance, so the time before fracture is largely extended.

The pipe systems according to the present invention exhibit walls with very smooth surface and no shark skin effect.

Finally, a further advantage of the pipe systems according to the present invention is that they are produced easily due to good workability of the polymers.

According to the present invention there is provided pipe systems having at least one layer comprising a semi-crystalline random polymer of propylene and 1-hexene and, optionally, a further recurring unit derived from the olefins selected from ethylene and a $C_4$-$C_{10}$ α-olefin, wherein the said polymer contains from 0.2 to 5 wt %, preferably 0.5 to 5 wt % of recurring units derived from hexene-1. The propylene-hexene-1 polymer exhibits broad molecular weight distribution, in terms of the ratio of weight average molecular weight to numeric average molecular weight ($\overline{M}w/\overline{M}n$), ranging from 5 to 11 and also molecular weight distribution of monomodal type.

By "molecular weight distribution of monomodal type" is meant therein that the molecular weight distribution curve obtained by GPC has a single maximum value.

The said propylene-hexene-1 polymer typically exhibits hexene-1 content in the fraction with an intrinsic viscosity of equal to or higher than 3.3 dl/g lower than the hexene-1 content in the fraction with an intrinsic viscosity of less than 3.3 dug. For example, the polymer exhibits an hexene-1 content of 1.5 wt % or less in the fraction with an intrinsic viscosity of equal to or higher than 3.5 dl/g and an hexene-1 content higher than 1.5 wt % in the fraction with an intrinsic viscosity of less than 3.3 dl/g. More typically, the hexene-1 content in the fraction with an intrinsic viscosity of less than 3.3 dl/g ranges from higher than 1.5 to 6 wt % and the hexene-1 content in the fraction with an intrinsic viscosity equal to or higher than 3.3 dl/g ranges from 0.1 to 1.5%, provided that the total hexene-1 content in the polymer ranges from 0.2 to 5 wt %.

The fractionation of the polymer is carried out by Solvent Gradient Elution Fractionation under the conditions indicated hereinbelow; the intrinsic viscosity is determined as described below.

The values of polydispersity index approximately range about from 3 to 10.

The said propylene-hexene-1 polymers used in the present invention have a stereoregularity of isotactic type of the propylenic sequences.

When present, the third comonomer is an olefin selected from ethylene and a linear or branched $CH_2=CHR$ α-olefins, wherein R is an alkyl radical with from 2 to 3 or from 5 to 6 carbon atoms. Preferred olefins are ethylene and butente-1. The amount of the third olefin monomer ranges from more than 0 to 9% by moles, preferably from 0.5 to 9% by moles, more preferably 1 to 7% by moles.

The propylene-hexene-1 polymers are preferably selected from copolymers of propylene and 1-hexene and terpolymers of propylene, hexene-1 and ethylene.

Typically, the said propylene-hexene-1 polymers also exhibit at least one of the following features:
  a melting temperature of or above 135° C., preferably of or above 140° C., such as from 140 to 155° C.; and
  a solubility in xylene at ambient temperature (i.e. about 25° C.) below 12 wt %.

The above polymers typically have a melt index of from 0.01 to 2.5 dg/min, according to ISO method 1133.

The propylene-hexene-1 polymers used in the present invention generally have a low amount of the polymer fraction soluble in hexane. Typically, the amount of said hexane-soluble fraction is 5.5% by weight or less, preferably 4% by weight or less.

The propylene-hexene-1 polymers for pipes according to the present invention have typically values of tensile yield strength over 25 MPa.

Typically the pipe systems according to the present invention exhibit a circumferential hoop stress resistance of at least 14,000 hours at 95° C., applying a hoop stress of 4.5 MPa, according to the internal pressure test. Typically they exhibit a value of full notch creep resistance higher than 7,000 hours according to the full notch creep test.

The said propylene-hexene-1 polymer may also be blended with other well-known polymers, such as different crystalline olefin polymers, elastomeric polymers and ethylene polymers. The said crystalline olefin polymer is preferably selected from isotactic propylene homopolymer and polymer of propylene and a comonomer selected from ethylene and a superior α-olefin, in particular 1-butene, or a mixture of said comonomers. In the polymer blend thus obtained the propylene-hexene-1 polymer is preferably in an amount ranging from 10 to 99 wt % and the said crystalline olefin polymer is in an amount from 1 to 90 wt % of the whole polymer blend.

When the elastomeric polyolefin is present, it is preferably in an amount of from 1 to 70 parts by weight with respect to 100 parts by weight of the propylene-hexene-1 polymer. The elastomeric polyolefin may be selected from the group consisting of:
a) a copolymer of ethylene with propylene and, optionally a diene, having an ethylene content of from 17 to 45 wt % and a propylene content from 55 to 83 wt %;
b) a polymer of ethylene and a $C_3$-$C_{10}$ α-olefin having an ethylene/$C_3$-$C_{10}$ α-olefin weight ratio of from 29 to 86 wt % ($^{13}$C-NMR analysis) and having a weight average molecular weight/number average molecular weight (Mw/Mn) ratio of less than 3.5.

In the polymer blend thus obtained the polymer of ethylene is preferably in an amount of from 1 to 30 parts by weight with respect to 100 parts by weight of the propylene-hexene-1 polymer. The polymer of ethylene possesses preferably a melting temperature over 120° C. and intrinsic viscosity of from 2 to 6 dL/g.

The propylene-hexene-1 polymers used in the present invention can be prepared by polymerisation in one or more polymerisation steps. Such polymerisation can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are 1,3-diethers of formula:

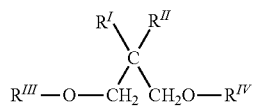

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl)fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si (OCH$_3$)$_2$, (cyclohexyl)(methyl)Si (OCH$_3$)$_2$, (cyclopentyl)$_2$Si (OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the random copolymers are preferably prepared by using catalysts containing a phthalate as inside donor and (cyclopentyl)$_2$Si(OCH$_3$)$_2$ as outside donor, or the said 1,3-diethers as inside donors.

The said propylene-hexene-1 polymers are typically produced by a well-known polymerisation process. According to the preferred polymerisation process such polymers are produced by a polymerisation process carried out in at least two interconnected polymerisation zones.

The process according to the preferred process is illustrated in EP application 782 587. In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture. The control of the polymer circulating between the two polymerisation zones can be effected by metering the amount of polymer leaving the downcomer using means suitable for controlling the flow of solids, such as mechanical valves.

The operating parameters, such as the temperature, are those that are usual in olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The polymer material, i.e. the above-mentioned propylene-hexene-1 polymers and polymer blends, may be blended with additives commonly employed in the art, such as antioxidants, light stabilizers, heat stabilizers, nucleating agents, colorants and fillers.

The pipes systems according to the present invention may be single layer or multilayer, wherein the layers can have the same or different thickness. In multilayer pipes, all the layers can be of the same polymer material. Otherwise, at least one layer is made from the polymer described above and the further layer(s) are made from amorphous or crystalline polymers of R—CH═CH$_2$, where R radical is a hydrogen or a C$_1$-C$_6$ alkyl radical, or their mixtures, fluorinated polymers, such as polyvinyl difluoride. Examples of said polymers are isotactic or mainly isotactic propylene homopolymers, polyethylene, heterophasic polyolefin compositions, which comprise a crystalline propylene polymer and an elastomeric ethylene polymer.

The pipe systems according to the present invention are produced in manner known per se, such as by extrusion or injection moulding of the polymer material. Multi-layer pipes are produced by coextrusion or other methods as well.

The following examples are given to illustrate the present invention without limiting purpose.

The data relating to the polymeric materials and the pipes and sheets of the examples are determined by way of the methods reported below.

Melting temperature: Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, temperatures corresponding to peaks are read.

Melt Flow Rate: Determined according to the method ISO 1133 (230° C., 5 kg).

Solubility in xylene: Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Intrinsic viscosity: Determined in tetrahydronaphthalene at 135° C.

1-hexene and ethylene content: Determined by IR spectroscopy in copolymers; determined by $^{13}$C-NMR spectroscopy in terpolymers.

$\overline{M}w$ and $\overline{M}n$: Measured by way of Gel Permeation Chromatography (GPC) in 1,2,4-trichlorobenzene.

Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$P.I.=10^5/Gc$ in which Gc is the crossover modulus which is defined as the value (expressed in Pa) at which G'=G" wherein G' is the storage modulus and G" is the loss modulus.

Solvent Gradient Elution Fractionation: About 2 g of the polymer were dissolved for 1 hour at 145° C. in 180 mL of a mixture of a solvent/nonsolvent pair: tetralin/carbitol. The polymer solution, stabilized with 0.1 g/L of Irganox 1010, was then loaded into a column packed with glass beads and cooled down gradually from 145° C. to 26° C. In this step the polymer precipitated out of the solution and deposited onto the column packing materials. The first fraction was obtained at 26° C. whereas the other fractions were collected after having raised the column temperature to 145° C. and by varying the composition of the eluting mixture in such a way to increase its dissolution power (increasing of the mixture solvent/nonsolvent ratio). The polymer fractions were obtained by precipitation with acetone, recovered by filtration on a 0.5-µm stainless-steel filter, dried under vacuum at about 70° C., and finally, weighted.

Internal pressure test: According to ISO method 1167, tests were carried out at temperature of 95° C. and under a stress of either 3.5 MPa or 4.5 MPa.

Full Notch Creep Test (FNCT): According to ISO 16770 method; the test was carried out at 80° C. and the stress applied was 4.0 MPa.

EXAMPLE 1

A copolymer is prepared by polymerising propylene and hexene-1 in the presence of a catalyst under continuous conditions in a plant comprising a polymerisation apparatus.

The catalyst is sent to the polymerisation apparatus that comprises two interconnected cylindrical reactors, riser and downcomer. Fast fluidisation conditions are established in the riser by recycling gas from the gas-solid separator.

The way to differentiate the gas composition in the two reactor legs is the "barrier" feed. This stream is propylene fed in the larger upper part of the downcomer.

The catalyst employed comprises a catalyst component prepared by analogy with example 5 of EP-A-728 769 but using microspheroidal $MgCl_2.1.7C_2H_5OH$ instead of $MgCl_2.2.1C_2H_5OH$. Such catalyst component is used with dicyclopentyl dimethoxy silane (DCPMS) as external donor and with triethylaluminium (TEA).

The copolymer shows a broad distribution of the molecular weights obtained by using a liquid barrier. The high molecular weight moiety is polymerised in the downcomer, while the low molecular weight moiety is obtained in the riser.

The polymer particles exiting the reactor are subjected to a steam treatment to remove the reactive monomers and volatile substances and then dried. The polymer particles are extruded with a usual packing of stabilisers in a Maris extruder. After 7 days the polymer particles are characterised.

The polymers thus produced were used to produce a single-layer pipe in a Bandera extruder operating at following conditions:

screw speed: 132 rpm;
extrusion speed: 8.6 m/min;
melting zone temperature: 220° C.;
die zone temperature: 220° C.

The resulting pipes had an outer diameter of 32.8 mm and a wall thickness of 5.35-5.8 mm. The pipe subjected to internal pressure test exhibited a time of resistance longer than 14,800 hours.

The pipe was also subjected to the full notch creep test. The FNCT value of the single-layer pressure pipe is over 7000 hours, versus an FNCT value of less than 500 hours for commercially available ethylene-propylene random copolymers.

EXAMPLE 2

Example 1 is repeated except that ethylene as comonomer is also fed in the polymerisation reactor along with 1-hesene. A poly(propylene-co-ethylene-co-hexene-1) is thus produced. The main operative conditions and characteristics of the produced polymers are indicated in Tables 1 and 2. The properties of the polymers are reported in Table 3.

A single-layer pipe as in example 1 was produced with the only difference that the above terpolymer was used.

On the pipes the full notch creep test was carried out. The FNCT value of the single-layer pressure pipe is over 5000 hours with no breaks.

COMPARATIVE EXAMPLE 1 (1c)

Example 1 was repeated except that the copolymer was replaced with a crystalline random copolymer of propylene and ethylene.

The polymer composition and properties are reported in Tables 2 and 3.

COMPARATIVE EXAMPLE 2

Example 1 was repeated except that the copolymer was replaced with a crystalline random copolymer of propylene and butene-1, the latter is in amounts of 6.8 wt %. The copolymer exhibits a melting temperature of 148° C. and a melt flow rate value of 0.28 g/10 min (determined at 230° C. and 2.16 kg).

The resulting pipes had an outer diameter of 32.4 mm and a wall thickness of 5.6 mm.

The pipe subjected to internal pressure test exhibited a time of resistance of 928 hours, the conditions of the test are as follows:

temperature: 95° C.,
burst applied stress: 4.2 MPa.

TABLE 1

| Examples | | 1 | 2 |
|---|---|---|---|
| TEA/solid catalyst component, g/g | | 10 | 5 |
| TEA/DCPMS, g/g | | 8 | 2 |
| $C_6^-/(C_3^- + C_6^-)$, | riser | 0.026 | 0.012 |
| mol/mol | downcomer | 0.1-0.05 | 0.023 |
| $C_2^-/(C_3^- + C_2^-)$, | riser | 0 | 0.008 |
| mol/mol | downcomer | 0 | 0.02 |

TABLE 2

| Examples and comparative example | 1 | 2 | 1c |
|---|---|---|---|
| $M_w/M_n$ | about 6.8 | 8.9 | 8 |
| Polydispersity index | 4.4 | 5.6 | 4.3 |
| 1-hexene content, wt % | 2.1 | 1.3 | 0 |
| Ethylene content, wt % | 0 | 3.3 | 4.2 |
| Xylene-soluble content, wt % | 3 | 8.3 | 8 |
| Intrinsic viscosity ([η]) of xylene-soluble fraction, dl/g | 1.77 | — | — |
| Hexene-1 content in fraction having 8 i] ≧ 3.3 dl/g | ≦1.5 | ≦1 | — |
| Hexene-1 content in fraction having [η] < 3.3 dl/g | >1.5 | >1 | — |
| Melting temperature, ° C. | 145 | 141 | 144 |

TABLE 3

| Examples and comparative example | $1^{1)}$ | $2^{2)}$ | 1c characterisation after 48 hours | 1c characterisation after 7 days |
|---|---|---|---|---|
| Melt flow rate, dg/min | 0.84 | 0.90 | 1.30 | 1.30 |
| Flexural modulus, MPa | 1120 | 870 | 936 | 965 |
| IZOD impact resistance, kJ/m² at 23° C. | 8.2 | N.B.³⁾ | N.B.³⁾ | N.B.³⁾ |
| at 0° C. | 4.3 | 15.1 | 14.5 | 12.6 |
| at −20° C. | 2.8 | 4.7 | 3.6 | 3.3 |
| Elongation at yield, % | — | 13 | 14.3 | 14.6 |
| Tensile yield strength, MPa | 30.4 | 26.3 | 33.8 | 31.9 |
| Elongation at break, % | 229 | 365 | 440 | 440 |
| Tensile break strength, MPa | 24.6 | 32.4 | 33.8 | 31.9 |
| Internal pressure resistance, hours under 3.5 MPa | >17,000 | — | 10,000 | |
| under 4.5 MPa | >14,800 | >3353 | 2500 | |

¹⁾Characterisation after 7 days;
²⁾Characterisation after 48 hours;
³⁾Not Broken.

The invention claimed is:

1. Pipe systems comprising at least one layer comprising a semi-crystalline random polymer of propylene and 1-hexene, wherein the semi-crystalline random polymer comprises from 0.2 to 5% by wt. of recurring units derived from hexene-1, and the semi-crystalline random polymer comprises:

a) a broad molecular weight distribution ranging from 5 to 11, in terms of a ratio of weight average molecular weight to numeric average molecular weight ($\overline{M}w/\overline{M}n$);
b) a monomodal molecular weight distribution;
c) a fraction with an intrinsic viscosity equal to or higher than 3.3 dl/g comprising hexene-1; and
d) a fraction with an intrinsic viscosity less than 3.3 dl/g comprising hexene-1;
wherein the fraction with the intrinsic viscosity equal to or higher than 3.3 dl/g comprising hexene-1 is lower in amount than the fraction with the intrinsic viscosity less than 3.3 dl/g comprising hexene-1.

2. The pipe systems according to claim 1, wherein the semi-crystalline random polymer of propylene and 1-hexene further comprises from more than 0 to 9% by moles of a recurring unit derived from an additional olefin, the additional olefin being selected from ethylene and at least one $C_4$-$C_{10}$ α-olefin.

3. The pipe systems according to claim 1, wherein the at least one layer comprises a polymer blend comprising the semi-crystalline random polymer of propylene and 1-hexene, and an elastomeric polyolefin.

4. The pipe systems according to claim 3, wherein the polymer blend comprises from 1 to 70 parts by weight of the elastomeric polyolefin with respect to 100 parts by weight of the semi-crystalline random polymer of propylene and 1-hexene.

5. The pipe systems according to claim 1, wherein the at least one layer comprises a polymer blend comprising the semi-crystalline random polymer of propylene and 1-hexene, and an ethylene polymer.

6. The pipe systems according to claim 5, wherein the polymer blend comprises from 1 to 30 parts by weight of the ethylene polymer with respect to 100 parts by weight of the semi-crystalline random polymer of propylene and 1-hexene.

7. The pipe systems according to claim 1, wherein the at least one layer comprises a polymer blend comprising the semi-crystalline random polymer of propylene and 1-hexene, and a crystalline olefin polymer.

8. The pipe systems according to claim 7, wherein the polymer blend comprises from 10 to 99 wt % of the semi-crystalline random polymer of propylene and 1-hexene, and from 1 to 90 wt % of the crystalline olefin polymer.

9. The pipe systems according to claim 1, wherein the pipe systems further comprise a circumferential hoop stress resistance of at least 14,000 hours at 95° C., applying a hoop stress of 4.5 MPa, according to ISO 1167.

10. The pipe systems according to claim 1, wherein the pipe systems further comprise a full notch creep resistance higher than 7,000 hours, according to ISO 16770.

* * * * *